(12) United States Patent
Dubé

(10) Patent No.: US 12,447,849 B1
(45) Date of Patent: Oct. 21, 2025

(54) SYSTEM OF POWER GENERATION ON-THE-GO FOR ELECTRIC VEHICLES (EVS) USING AN AIRBINE

(71) Applicant: Bernard Julien Dubé, Anthem, AZ (US)

(72) Inventor: Bernard Julien Dubé, Anthem, AZ (US)

( * ) Notice: Subject to any disclaimer, the term of this patent is extended or adjusted under 35 U.S.C. 154(b) by 0 days.

(21) Appl. No.: 19/010,827

(22) Filed: Jan. 6, 2025

(51) Int. Cl.
| | |
|---|---|
| *B60L 53/52* | (2019.01) |
| *B60L 7/10* | (2006.01) |
| *B60L 53/56* | (2019.01) |
| *B60L 53/60* | (2019.01) |
| *F03D 9/25* | (2016.01) |
| *F03D 9/32* | (2016.01) |

(52) U.S. Cl.
CPC ............. *B60L 53/52* (2019.02); *B60L 7/10* (2013.01); *B60L 53/56* (2019.02); *B60L 53/60* (2019.02); *F03D 9/25* (2016.05); *F03D 9/32* (2016.05); *F05B 2220/706* (2013.01); *F05B 2240/941* (2013.01); *F05B 2260/70* (2013.01)

(58) Field of Classification Search
CPC .......... B60L 53/52; B60L 53/60; B60L 53/56; B60L 7/10; F03D 9/25; F03D 9/32; F05B 2220/706; F05B 2240/941; F05B 2260/70
See application file for complete search history.

(56) References Cited

U.S. PATENT DOCUMENTS

| | | | |
|---|---|---|---|
| 5,680,032 A * | 10/1997 | Pena | B60L 50/30 290/55 |
| 6,327,994 B1 | 12/2001 | Labrador | |
| 6,373,145 B1 * | 4/2002 | Hamrick | F03D 9/25 290/55 |
| 6,838,782 B2 | 1/2005 | Vu | |
| 7,808,121 B1 * | 10/2010 | Glynn | F03D 9/25 290/55 |
| 7,810,589 B2 * | 10/2010 | Frierman | F03D 9/32 180/2.2 |
| 11,267,335 B1 * | 3/2022 | Knickerbocker | F03D 3/0409 |
| 2003/0057707 A1 | 3/2003 | Wu | |
| 2004/0084908 A1 | 5/2004 | Vu | |
| 2008/0155985 A1 | 7/2008 | Labrador | |

(Continued)

*Primary Examiner* — Carlos Amaya
(74) *Attorney, Agent, or Firm* — Carson Patents; Gregory D Carson, Patent Attorney

(57) ABSTRACT

This invention relates to an airbine system designed to enhance the power generation and battery efficiency of electric vehicles (EVs). The airbine integrates into the vehicle, utilizing the kinetic energy of moving air to drive its powerhouse/generator group. The internal components of the powerhouse are designed with significant mass to act as a flywheel, enabling continuous electricity generation even during short periods of vehicle inactivity, such as at traffic lights or passenger pickups. This system ensures that the EV's batteries remain charged, extending the driving range and reducing reliance on external charging infrastructure. The airbine also features optimized airflow management through adjustable blades, maximizing energy capture. Additionally, the system integrates with regenerative braking technology to further enhance energy efficiency. By maintaining a consistent battery charge, the airbine system improves overall performance, sustainability, and convenience for EV users.

12 Claims, 4 Drawing Sheets

(56) References Cited

U.S. PATENT DOCUMENTS

| | | |
|---|---|---|
| 2011/0100731 A1 | 5/2011 | Hassan |
| 2011/0101698 A1 | 5/2011 | Saluccio |
| 2023/0050875 A1 | 2/2023 | Riley |
| 2023/0052778 A1 | 2/2023 | Kawashima |
| 2023/0226935 A1 | 7/2023 | Barrera |

* cited by examiner

SYSTEM OF POWER GENERATION ON-THE-GO FOR ELECTRIC VEHICLES (EVS) USING AN AIRBINE

BACKGROUND OF THE INVENTION

Technical Field

This invention relates generally to a system for generating electricity using airflow. This invention relates more particularly to an apparatus/device for harnessing the kinetic energy of moving air to produce electrical power.

This invention relates generally to apparatuses and devices for converting mechanical energy from airflow into electrical energy. This method also can be used with various systems, including electric vehicles (EVs) and stationary energy systems. This invention relates more particularly to a device designed to integrate with electric vehicles to maintain battery charge and improve overall efficiency and range.

This invention relates to the field of EVs and, more specifically, to a system that utilizes an airbine to generate electricity for recharging batteries on-the-go, leveraging the mass of internal components to function as a flywheel for sustained power generation. An airbine is a specialized fan and/or turbine device/system designed to generate electricity by harnessing the kinetic energy of moving air.

Background Art

EVs require efficient and reliable means of recharging their batteries to ensure continuous operation. Conventional methods of recharging EV batteries rely heavily on external power sources. The present invention introduces an airbine system designed to generate electricity using the mass of internal components as a flywheel, providing a sustained power source even when the EV is stationary for short periods.

The following paragraphs summarize ten prior art documents related to various innovations in wind and solar energy capturing systems for vehicles. These documents provide a range of designs and methods aimed at improving energy efficiency and sustainability in automotive technology and other applications Firstly, a prior art document describes a wind-powered vehicle designed to utilize wind turbines to generate electricity as the vehicle moves. The turbine blades are strategically placed to capture wind and rotate, driving a generator that produces electricity. This electricity is then stored in batteries onboard the vehicle, which can be used to power the vehicle itself. The system can be extended by connecting a trailer equipped with additional turbines and generators, further increasing the vehicle's energy production capabilities. Additionally, the document explores configurations that include solar panels and multiple turbines to maximize energy efficiency and capture.

Secondly, another prior art document outlines a comprehensive system featuring various types of generator units installed on a vehicle to supplement its power supply. This system includes propeller-type, turbine-type, and rolling wheel-type generators, each positioned to capture energy from different aspects of the vehicle's motion. The generated electricity is managed by a rectifier center and stored in the vehicle's batteries. The goal of this system is to enhance the efficiency of both fossil fuel and electric-powered vehicles by generating additional power during operation, thereby reducing environmental impact and improving energy efficiency.

Furthermore, another prior art document discusses a wind energy capturing device designed for moving vehicles. The device features a wind turbine mounted on the vehicle, which captures the wind force generated as the vehicle moves. The turbine drives a generator to produce electricity, which can be stored in batteries or used directly to power the vehicle. The document highlights the efficient utilization of wind energy, typically lost to drag, by converting it into a beneficial power source for electric or hybrid vehicles. This approach aims to extend the range of such vehicles and decrease their dependence on traditional fuels.

Additionally, another prior art document details a dynamic vehicle charging system that integrates wind turbines with electric vehicles. As the vehicle travels, the turbines capture wind energy and convert it into electricity through a generator. This electricity is used to recharge the vehicle's batteries or to directly supplement its energy consumption. The system aims to improve the efficiency and range of electric vehicles by harnessing renewable wind energy, reducing the need for stationary charging stations, and promoting overall sustainability.

Moreover, another prior art document describes a multiple installation variegated generator system for vehicles, incorporating various types of generators such as propeller, turbine, and rolling wheel types. These generators are strategically positioned on the vehicle to capture wind and rotational energy as the vehicle moves, converting it into electricity to supplement the vehicle's power supply. The system aims to enhance the efficiency of fossil fuel and electric-powered vehicles, reduce emissions, and provide additional power for extended vehicle operation.

Similarly, another prior art document outlines a wind-powered vehicle with turbine blades mounted to capture wind and generate electricity while the vehicle is in motion. The generated electricity is stored in batteries and used to power the vehicle, potentially supplemented by solar panels. The system includes detailed configurations for optimal energy capture and storage, aiming to reduce reliance on traditional fuels and increase the efficiency of electric and hybrid vehicles.

In addition, another prior art document presents a scavenger energy converter system that utilizes a wide-face design to capture wind and solar energy more effectively. The system includes applications for vehicles, boats, and stationary platforms, using wide-face sails or solar traps to maximize energy capture. The energy is then converted into electricity for various uses, such as powering vehicles, boats, or providing energy for buildings. The system aims to improve energy efficiency and sustainability by harnessing renewable energy sources.

Furthermore, another prior art document details an advanced generator set enclosure designed to enhance cooling and efficiency. The generator set includes an airflow path with an air inlet and outlet, a power generator, an alternator, and a radiator. The design optimizes the cooling airflow to improve the performance and longevity of the generator. The document emphasizes the importance of effective cooling in maintaining the efficiency and reliability of generator systems.

Additionally, another prior art document describes a method and apparatus for using waste heat and energy from various industrial processes to generate additional power. This includes capturing heat from exhaust systems, using hydrogen bombs underwater to produce heat energy, and implementing advanced smelting and power plant designs. The goal is to improve energy efficiency and sustainability by reusing waste heat and developing innovative energy capture methods.

Finally, another prior art document discusses a solar and wind-powered electric vehicle, featuring multiple wind turbine systems and solar panels. The vehicle is designed to capture wind and solar energy while in motion, converting it into electricity to charge the vehicle's batteries and power its systems. The document provides detailed descriptions of the vehicle's design, including air ducts and turbine configurations, aiming to create a perpetual, fuel-free electric vehicle by maximizing the use of renewable energy sources.

In conclusion, these prior art documents collectively highlight the significant advancements in harnessing renewable energy sources for vehicular applications. From wind and solar power integration to innovative generator systems, these technologies aim to enhance the efficiency and sustainability of both electric and fossil fuel-powered vehicles. However, in light of the foregoing prior art, there is a need for an airbine system to better sustain and optimize on-the-go power generation and battery efficiency of electric vehicles.

BRIEF SUMMARY OF THE INVENTION

The present invention is an airbine system integrated into an electric vehicle, wherein the internal components of the powerhouse/generator group produce electricity and act as a flywheel to continue producing electricity even during brief stops. This system ensures the batteries remain charged even when the EV is not in motion, such as at traffic lights or during passenger pickups.

The present invention provides a power generation system for an electric vehicle comprising an airbine housed within the vehicle, a powerhouse/generator group within the airbine, a battery pack with at least two charging ports connected to the powerhouse/generator group, and a control unit for managing and reporting on the operation of the power generation system. The powerhouse/generator group includes internal components such as a first fan blade and a second fan blade with a mass sufficient to act as a momentum flywheel.

The system is designed to maintain rotation and continue producing electricity during short periods of inactivity of the electric vehicle. It also includes a sensor for detecting vehicle movement, with the control unit regulating the operation of the airbine based on the vehicle's movement status. The control unit can deactivate the powerhouse/generator group when the vehicle remains stationary for an extended period to prevent wear and potential harm to the airbine and its components. Additionally, the system includes a manual override mechanism and adjustable blades or vanes to optimize airflow.

According to a first aspect of the invention, there is a power generation system for an electric vehicle comprising: an airbine housed within said electric vehicle; a powerhouse/generator group within said airbine; wherein a plurality of internal components, including at least a first fan blade and a second fan blade, of said powerhouse/generator group have a mass sufficient to act as a momentum flywheel; a battery pack having at least two charging ports connected to said powerhouse/generator group for storing generated electricity; and a control unit for managing and reporting on an operation of said power generation system.

According to a second aspect of the invention, there is a power generation system wherein said mass of said plurality of internal components of said powerhouse/generator group is configured to maintain rotation and continue producing electricity during a short period of inactivity of said electric vehicle.

According to a third aspect of the invention, there is a power generation system further comprising: a sensor for detecting a movement of said electric vehicle, and wherein said control unit is configured to regulate said operation of said airbine based on a status of said movement of said electric vehicle.

According to a fourth aspect of the invention, there is a power generation system wherein said control unit deactivates said powerhouse/generator group when said electric vehicle remains stationary for an extended period configured to prevent wear by limiting a speed of rotation of said plurality of internal components in order to prevent a harm or a destruction of said airbine and/or said plurality of internal components due to an excess in said speed of rotation from a pressure of air.

According to a fifth aspect of the invention, there is a power generation system wherein said control unit allows said powerhouse/generator group to continue recharging said battery pack until friction and gravity bring said plurality of internal components to a stop during prolonged periods of inactivity.

According to a sixth aspect of the invention, there is a power generation system further comprising a mechanism to manually override said control unit and continue power generation irrespective of a status of a movement of said electric vehicle.

According to a seventh aspect of the invention, there is a power generation system wherein said airbine is designed to optimize airflow to maximize a rotational energy imparted to said powerhouse/generator group.

According to an eighth aspect of the invention, there is a power generation system wherein said airbine further comprises adjustable blades or vanes to control airflow based on an electric vehicle speed and/or an environmental condition.

According to a ninth aspect of the invention, there is a power generation system wherein said powerhouse/generator group includes a combination of a rotor and stator configured to generate electricity from rotational energy.

According to a tenth aspect of the invention, there is a power generation system wherein said airbine is integrated into an existing power management system of said electric vehicle to ensure an efficient distribution and usage of said generated electricity.

According to an eleventh aspect of the invention, there is a power generation system further comprising a regenerative braking system that captures a kinetic energy during braking and converts said kinetic energy into electrical energy to be stored in said battery pack.

According to a twelfth aspect of the invention, there is a method for generating electricity in an electric vehicle comprising the steps of: providing an airbine system with a powerhouse/generator group having internal components with a mass sufficient to act as a momentum flywheel, detecting an electric vehicle movement and managing an operation of said airbine system based on said electric vehicle movement, generating an electric current during an electric vehicle motion and short periods of inactivity, and storing said electric current in a battery pack.

According to a thirteenth aspect of the invention, there is a method for generating electricity further comprising a step of deactivating said airbine system when said electric vehicle remains stationary for an extended period.

According to a fourteenth aspect of the invention, there is a method for generating electricity further comprising a step of continuing to generate said electric current until friction and gravity bring said internal components to a stop during prolonged inactivity.

According to a fifteenth aspect of the invention, there is a method for generating electricity wherein said airbine system optimizes airflow through adjustable blades or vanes to maximize energy generation.

Summary of Advantages of the Airbine System for Electric Vehicles

On-the-go Charging: Eliminates the need to stop for recharging, extending vehicle range and saving time and money on electricity purchases.

Reduced Waiting Times: Minimizes the need to wait in line at public charging stations.

Relief for the Electrical Grid: Decreases the additional stress on the grid caused by the charging of numerous EVs.

Environmental Benefits: Reduces reliance on coal or fossil fuel power plants for electricity generation, thus decreasing pollution.

Increased EV Adoption: Lowers the cost of using EVs, rekindling interest in EV ownership and potentially reducing overstock issues at dealerships.

Protection of Domestic Industries: Supports US EV and car industries by potentially leading to regulations that mandate airbine installation in all new vehicles.

Seamless Integration: Designed to be installed during the manufacturing process like any other vehicle component, eliminating the need for special financing.

Operation During Blackouts: Ensures vehicle usability during power outages, benefiting critical services such as police and ambulance services.

Government Savings: Offers significant cost savings for city, state, and federal governments by reducing fuel expenses.

Extended Fossil Fuel Availability: Helps extend the supply of fossil fuels by reducing the overall need for them.

Emergency Readiness: Keeps first responders 'vehicles operational during natural disasters or grid failures.

Reduced Terrorism Risk: Lowers the attractiveness of power plants as targets for terrorist attacks by reducing dependency on the grid.

Increased Grid Capacity: Frees up capacity on the electrical grid, allowing for reduced use of coal and fossil fuels.

Enhanced Public Safety: Provides a backup system for essential services and infrastructure in case of grid failure.

Safety in Accidents: Does not contribute to fire hazards in the event of a vehicle accident.

Environmental Footprint Reduction: Contributes to a smaller environmental footprint of vehicles, enhancing sustainability.

Protection from Road Hazards: Positioned under the hood to be safeguarded from road debris and adverse weather conditions.

The invention will now be described, by way of example only, with reference to the accompanying drawings in which:

DETAILED DESCRIPTION OF THE INVENTION

Figure 1:
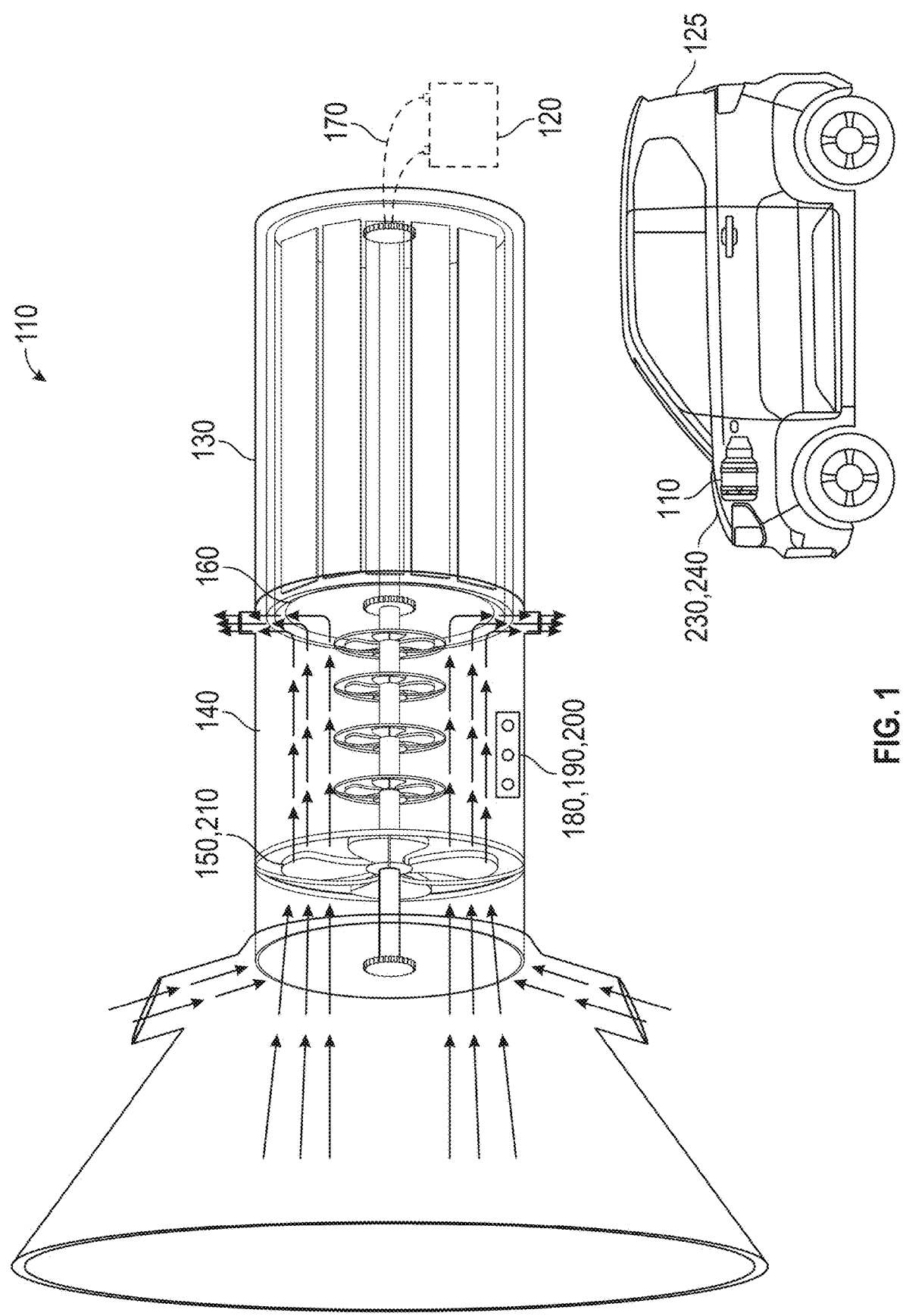
FIG. 1 is a side perspective view of a first variant of the system for power generation using an airbine including an electric vehicle according to the invention.

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Throughout this specification, the phrase "momentum flywheel" will be understood to imply that the weight of the internal components of the powerhouse/generator group is designed and sized to be massive enough to act as a form of flywheel. A person having ordinary skill in the art would recognize that flywheel functionality requires a specific mass and rotational inertia sufficient to maintain angular momentum when external driving forces (such as airflow) are temporarily absent. Accordingly, the internal components, including fan blades and associated rotating structures, are engineered to possess this rotational inertia, allowing them to continue rotating under their own momentum. This enables the continued production of electrical energy for a period of time even after vehicle motion has ceased or airflow has diminished.

When the EV is not moving for longer periods, such as overnight or during extended inactivity, the generator can be set to either stop or continue recharging the batteries until friction and gravity gradually bring the components to a halt. The flywheel effect provided by the mass of the internal components is critical in this context, as it allows continued rotation after airflow stops. The kinetic energy stored in the rotating mass enables energy generation during short-term inactivity. A person of ordinary skill in the art would appreciate that the flywheel effect is directly proportional to the moment of inertia of the rotating components, and such mass/inertia values are commonly derived based on the desired energy output and rotational decay time.

In essence, the momentum flywheel concept integrates the advantages of traditional flywheels into the powerhouse/generator group of an EV, leveraging the mass and rotational inertia of the internal components to maintain energy production even when external inputs are temporarily halted. This results in a more resilient and efficient energy management system for the vehicle.

Throughout this specification, the word "airbine" will be understood to imply a specialized fan and/or turbine device/system designed to generate electricity by harnessing the kinetic energy of moving air. It operates on principles similar to those of a wind turbine but is optimized for integration within various systems, such as vehicles or stationary structures, where air movement is utilized to drive the generation of power.

Key Characteristics of an Airbine

Airflow Utilization: An airbine captures and directs airflow through its structure to induce rotational motion in its internal components.

Powerhouse/Generator Group: The central component of the airbine, consisting of a rotor and stator, converts mechanical energy from the rotating parts into electrical energy.

Flywheel Effect: The internal components of the powerhouse/generator group have significant mass, acting as a flywheel to maintain rotational momentum and sustain electricity generation even during intermittent airflow. This design leverages the conservation of angular momentum, such that once the airbine is rotating, the internal mass continues spinning even when airflow is interrupted. A skilled artisan in the field of mechanical or electrical engineering would understand that this design can be achieved by selecting appropriate materials, geometries, and mass distributions for the internal components, such as using denser materials or increasing the radius of rotating elements to maximize moment of inertia.

Control Mechanisms: Advanced control systems regulate the airbine's operation, optimizing energy capture based on real-time conditions and ensuring efficient power generation and storage. These control mechanisms can also account for the decay of rotation over time, regulating generation until the momentum dissipates. The mass of the internal components is selected specifically to ensure sufficient inertia for this continued generation period, based on standard flywheel design principles known in the art.

Integration Capability: Airbines are designed to be integrated into various applications, including electric vehicles (EVs) and stationary energy systems, providing a supplemental or primary source of electrical power. For example, the internal flywheel-like components may be designed in accordance with flywheel sizing equations (e.g., $E=1/2\ Iw^2$), where these parameters are routinely calculated by engineers familiar with energy storage and power generation systems to meet the application requirements.

In the context of electric vehicles, an airbine can be strategically positioned to harness the airflow generated by the vehicle's motion. The airbine's powerhouse/generator group continues to produce electricity during short periods of vehicle inactivity, such as at traffic lights or during passenger pickups. This ensures that the vehicle's batteries remain charged, enhancing the overall efficiency and range of the EV. Accordingly, a person of ordinary skill in the art would be able to design the internal rotating components of the airbine with sufficient mass and geometry to achieve flywheel-like performance suitable for the energy storage and generation durations described.

By leveraging the airbine technology, electric vehicles can benefit from a continuous and sustainable source of power, reducing reliance on external charging infrastructure and improving the practicality and convenience of EV usage. The momentum-based continuation of rotation enables electricity production during traffic stops or passenger pickups, as described. This flywheel-based energy buffering is intentionally engineered and understood by practitioners in the energy and electromechanical systems fields.

By leveraging the airbine technology, electric vehicles can benefit from a continuous and sustainable source of power, reducing reliance on external charging infrastructure and improving the practicality and convenience of EV usage. The key enabling feature of this continuity is the flywheel effect generated by the rotating internal components of the powerhouse/generator group. Their mass and design allow for rotation to persist long enough to sustain generation during brief stationary periods. Flywheel design and integration is well known in the art and can be readily implemented using conventional materials and modeling tools to satisfy specific performance targets.

This system represents a significant advancement in EV technology, offering a sustainable and efficient method for maintaining battery charge, thereby improving the overall performance and convenience of electric vehicles.

Figure 2:
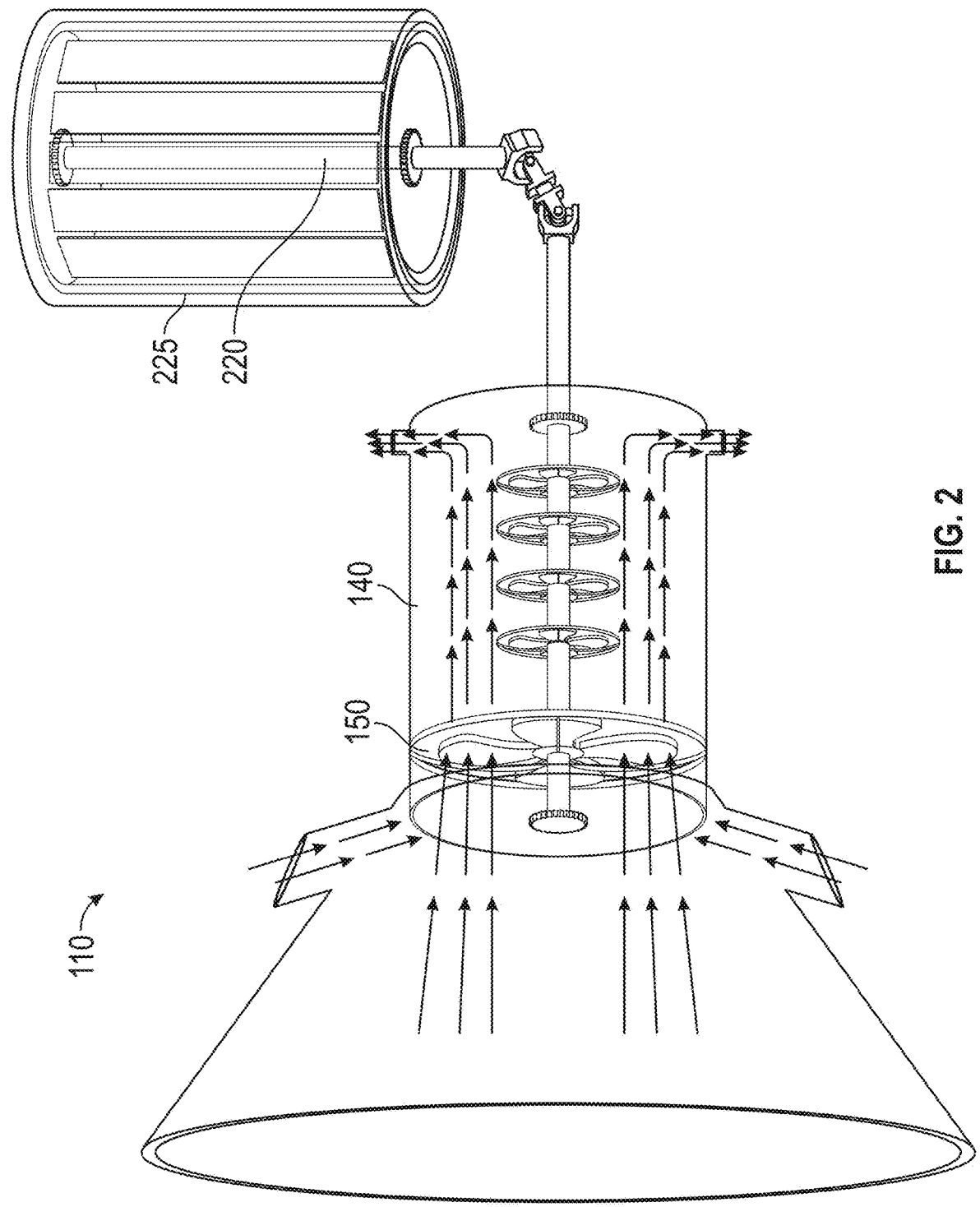
FIG. 2 is a side perspective view of a second variant of the system for power generation using an airbine according to the invention.
Figure 3:
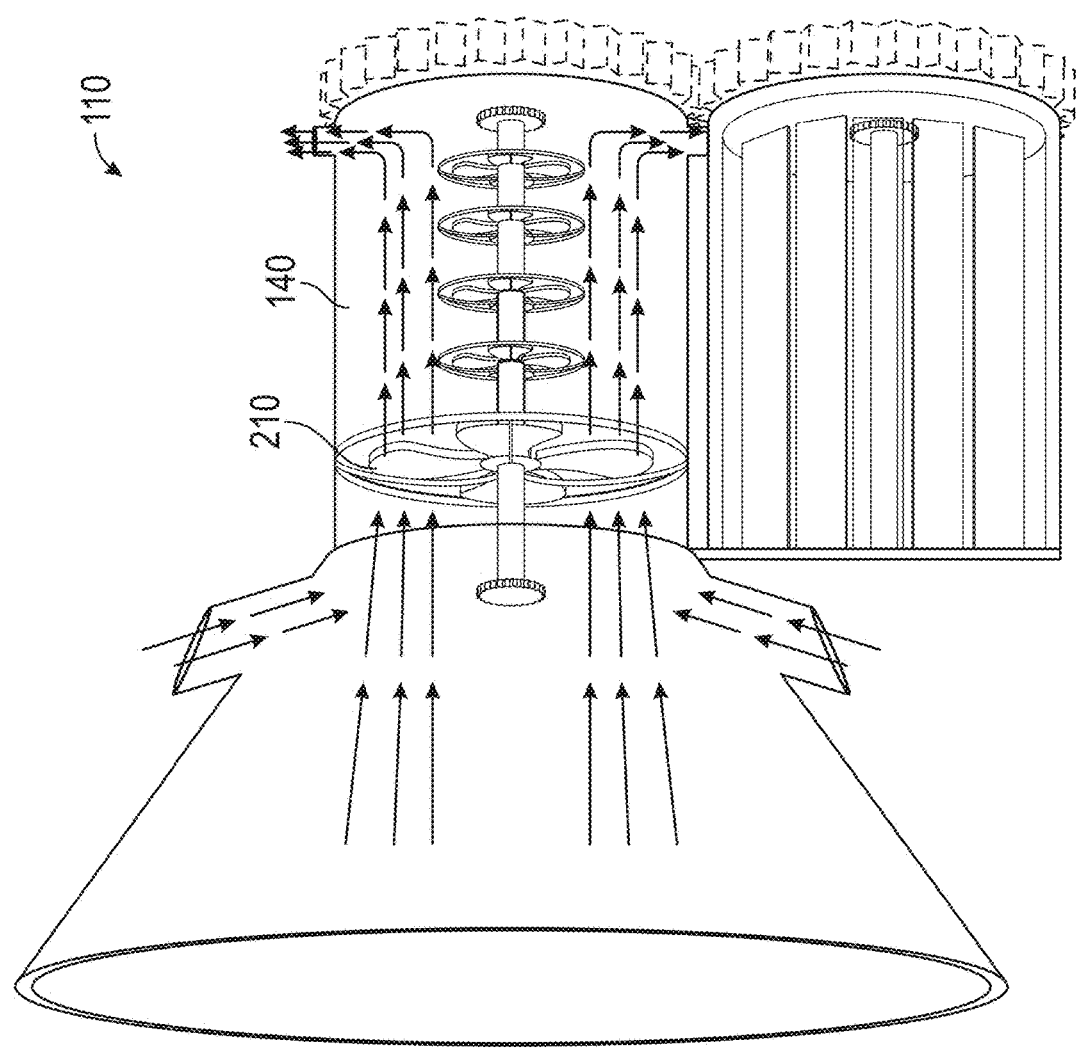
FIG. 3 is a side perspective view of a third variant of the system for power generation using an airbine according to the invention.
Figure 4:
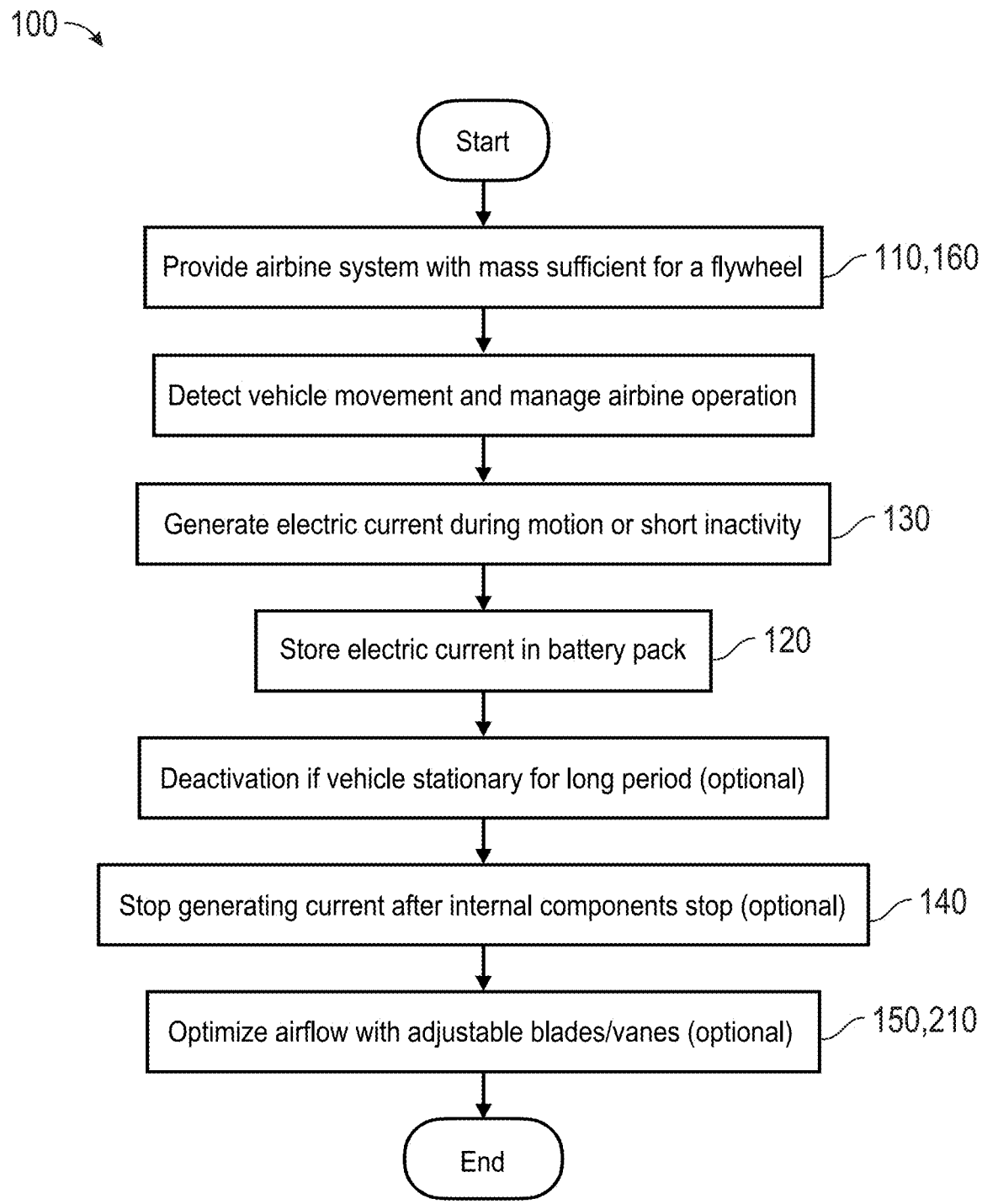
FIG. 4 is a flowchart of the system for power generation using an airbine optimization.

Index of Labelled Features in Figures. Features are listed in numeric order by Figure in numeric order. Referring to the Figures, there is shown in FIGS. 1, 2, 3, and 4 the following features:

Element 100 which is a power generation system for electric vehicles.
Element 110 which is an airbine.
Element 120 which is a battery pack of an electric vehicle.
Element 125 which is an electric vehicle.
Element 130 which is a powerhouse/generator group.
Element 140 which is a plurality of internal components.
Element 150 which is a fan blade.
Element 160 which is a momentum flywheel.
Element 170 which is a charging port.
Element 180 which is a control unit.
Element 190 which is a sensor.
Element 200 which is a mechanism to manually override the control unit.
Element 210 which is an adjustable blade or vane to control airflow.
Element 220 which is a rotor.
Element 225 which is a stator.
Element 230 which is an existing power management system of the electric vehicle.
Element 240 which is a regenerative braking system.

The weight of the internal components of the powerhouse/generator group of the airbine should be massive enough to act as a form of flywheel so that the rotation of the components inside the powerhouse/generator group continues to produce electricity to recharge the batteries, even if the EV is not moving for a short while, like for a traffic light or to take on a passenger like a cab would do or a delivery truck for instance. When the EV is not moving for longer periods, the generator could be set to stop or to continue recharging the batteries until the friction and gravity bring the components of the airbine to a stop, like overnight or for a long period of inactivity.

To construct the power generation system, begin by designing an airbine that can be housed within the electric vehicle. This involves creating a compact, aerodynamic structure that can be integrated seamlessly into the vehicle's existing design. The airbine should be positioned to maximize exposure to airflow, such as in the front grille area or under the vehicle's body. Inside the airbine, install a powerhouse/generator group that includes internal components like a first fan blade and a second fan blade. These components should be made of materials with sufficient mass to act as a momentum flywheel, helping to maintain rotation and generate electricity even during short stops. Connect a battery pack to the powerhouse/generator group, ensuring it has at least two charging ports for efficient electricity storage. Secure the battery pack within the vehicle for easy accessibility. Additionally, install a control unit to manage and report on the operation of the power generation system, interfacing with sensors and other vehicle systems.

The system requires the integration of sensors to detect the movement of the electric vehicle. These sensors provide real-time data to the control unit, enabling it to adjust the airbine's operation accordingly. Design and install adjustable blades or vanes within the airbine to control airflow, which should adjust based on the vehicle's speed and environmental conditions to optimize energy capture. Furthermore, incorporate a regenerative braking system that captures kinetic energy during braking and converts it into electrical energy for storage in the battery pack. Ensure the control unit software is capable of regulating the airbine's operation based on the vehicle's movement status, and include a manual override mechanism for scenarios where continuous power generation is necessary regardless of the vehicle's movement.

Once the system is installed, start the electric vehicle as usual, allowing the airbine to capture airflow as the vehicle moves. The powerhouse/generator group will convert this airflow into rotational energy, which is then converted into electricity and stored in the battery pack. The control unit will continuously monitor the vehicle's movement and adjust the airbine's operation to ensure optimal performance. If the vehicle remains stationary for an extended period, the control unit will deactivate the powerhouse/generator group to prevent wear and potential damage from excessive rotation speed. In cases where continuous power generation is needed, the manual override mechanism can keep the airbine operational.

The generated electricity is stored in the battery pack and can be used to power the vehicle's electric motor and other systems. During short periods of inactivity, the momentum flywheel effect of the internal components will help maintain rotation and continue electricity production. The adjustable blades or vanes within the airbine will automatically adjust based on the vehicle's speed and external conditions to maximize energy generation. The control unit ensures efficient airflow management, providing continuous power generation. During braking, the regenerative braking system captures kinetic energy and converts it into electrical energy, which is then stored in the battery pack, enhancing the overall efficiency of the power generation system.

Regular maintenance is crucial for the system's longevity and efficiency. Regularly check the airbine and its components for wear and tear, and ensure that the control unit software is updated to maintain optimal performance. Periodically service the battery pack and charging ports to ensure efficient energy storage and usage. By following these steps, the power generation system for an electric vehicle can be effectively constructed and utilized, providing continuous power generation, improved battery efficiency, and enhanced sustainability for electric vehicles.

How to Make the Device

Airbine Housing: Design an airbine that can be securely mounted within the electric vehicle, typically in areas with optimal airflow such as the front grille, undercarriage, or roof. The housing should be constructed from lightweight, durable materials like aluminum or carbon fiber to withstand environmental elements and vehicle dynamics. The design should focus on minimizing drag while maximizing the capture of incoming air to drive the internal components effectively.

Powerhouse/Generator Group: Construct the powerhouse/generator group to include at least a first fan blade and a second fan blade. These blades should be made from high-strength materials like composite fibers to ensure durability and efficiency. The internal components, including the fan blades, should have a mass sufficient to act as a momentum flywheel, meaning they can store kinetic energy and maintain rotation even when the vehicle's speed decreases. This can be achieved by carefully calibrating the weight and balance of the components.

Battery Pack: Develop a battery pack with advanced lithium-ion or solid-state cells to store the generated electricity efficiently. The battery pack should have at least two charging ports to facilitate rapid charging and discharging cycles. These ports connect directly to the powerhouse/generator group, ensuring seamless energy transfer. Incorporate thermal management systems within the battery pack to prevent overheating and enhance longevity.

Control Unit: Design a sophisticated control unit equipped with microcontrollers and sensors to manage the operation of the power generation system. The control unit should include software algorithms to monitor vehicle speed, air flow, and energy output. It should also provide real-time reporting on the system's performance via a user interface accessible from the vehicle's dashboard or a connected mobile device.

Sensors: Install sensors throughout the vehicle to detect various parameters such as vehicle speed, acceleration, deceleration, and ambient air conditions. These sensors should be highly accurate and responsive, providing data to the control unit to adjust the airbine's operation dynamically. Common sensor types include accelerometers, gyroscopes, and anemometers.

Airflow Optimization Mechanism: Incorporate adjustable blades or vanes within the airbine to control airflow based on the vehicle's speed and environmental conditions. These blades can be adjusted electronically through actuators controlled by the control unit. The design should ensure that the blades can optimize the angle of attack to maximize rotational energy at various speeds and air densities.

Regenerative Braking System: Integrate a regenerative braking system that captures kinetic energy during braking and converts it into electrical energy. This system includes advanced brake-by-wire technology and high-efficiency generators. The captured energy is routed back to the battery pack, enhancing the overall efficiency of the power generation system.

How to Use the Device

Operation Initiation: Upon vehicle start-up and movement, the airbine begins to operate. As the vehicle moves, air flows through the airbine, causing the fan blades to spin. This rotational motion drives the powerhouse/generator group to produce electricity. The control unit continuously monitors vehicle speed and adjusts the airbine's components for optimal performance.

Energy Storage: The electricity generated by the powerhouse/generator group is transferred to the battery pack through the charging ports. The control unit manages the charging process, ensuring the battery pack is charged efficiently and safely. The system can display the state of charge and other relevant data on the vehicle's dashboard or a connected mobile device.

Control Unit Regulation: The control unit receives real-time data from the sensors and adjusts the airbine's operation accordingly. For instance, if the vehicle accelerates, the control unit may adjust the blade angles to capture more air and increase energy generation. Conversely, during deceleration or slower speeds, the control unit optimizes the system to maintain efficiency and prevent unnecessary wear.

Inactivity Management: When the vehicle stops or moves slowly, the inertia of the internal components (acting as a momentum flywheel) keeps the fan blades spinning for a short period. This continued rotation generates electricity even during brief periods of inactivity. If the vehicle remains stationary for an extended period, the control unit deactivates the powerhouse/generator group to prevent wear and conserve energy.

Manual Override: A manual override mechanism allows the user to continue power generation regardless of the vehicle's movement status. This can be useful in specific scenarios where continuous power generation is necessary. The manual override can be activated via a switch or a command through the vehicle's control interface.

Prolonged Inactivity: During prolonged periods of inactivity, the control unit allows the airbine to continue generating electricity until the rotational energy of the internal components is dissipated by friction and gravity. This ensures that the system maximizes energy generation even when the vehicle is not in motion.

Integration with Power Management System: The generated electricity is seamlessly integrated into the vehicle's existing power management system. This ensures that the stored energy is efficiently distributed to various vehicle systems as needed. The integration also allows for intelligent energy usage, prioritizing essential functions and optimizing overall vehicle performance.

Regenerative Braking: During braking, the regenerative braking system captures kinetic energy and converts it into electrical energy. This energy is stored in the battery pack, reducing the reliance on external charging sources and enhancing the vehicle's overall efficiency. The control unit manages the transition between regenerative braking and traditional braking to ensure smooth and effective deceleration.

By following these expanded steps, the device can effectively generate and store electricity, significantly enhancing the efficiency and sustainability of the electric vehicle.

In a preferred embodiment of the invention, there is a power generation system for an electric vehicle comprising: an airbine housed within said electric vehicle; a powerhouse/generator group within said airbine; wherein a plurality of internal components, including at least a first fan blade and a second fan blade, of said powerhouse/generator group have a mass sufficient to act as a momentum flywheel; a battery pack having at least two charging ports connected to said powerhouse/generator group for storing generated electricity; and a control unit for managing and reporting on an operation of said power generation system.

In an alternate embodiment of the invention, there is a power generation system wherein said mass of said plurality of internal components of said powerhouse/generator group is configured to maintain rotation and continue producing electricity during a period of inactivity of said electric vehicle.

In an alternate embodiment of the invention, there is a power generation system further comprising: a sensor for detecting a movement of said electric vehicle, and wherein said control unit is configured to regulate said operation of said airbine based on a status of said movement of said electric vehicle.

In an alternate embodiment of the invention, there is a power generation system wherein said control unit deactivates said powerhouse/generator group when said electric vehicle remains stationary for an extended period configured to prevent wear by limiting a speed of rotation of said plurality of internal components in order to prevent a harm or a destruction of said airbine and/or said plurality of internal components due to an excess in said speed of rotation from a pressure of air.

In an alternate embodiment of the invention, there is a power generation system wherein said control unit allows said powerhouse/generator group to continue recharging said battery pack until friction and gravity bring said plurality of internal components to a stop during prolonged periods of inactivity.

In an alternate embodiment of the invention, there is a power generation system further comprising a mechanism to manually override said control unit and continue power generation irrespective of a status of a movement of said electric vehicle.

In an alternate embodiment of the invention, there is a power generation system wherein said airbine is designed to optimize airflow to maximize a rotational energy imparted to said powerhouse/generator group.

In an alternate embodiment of the invention, there is a power generation system wherein said airbine further comprises adjustable blades or vanes to control airflow based on an electric vehicle speed and/or an environmental condition.

In an alternate embodiment of the invention, there is a power generation system wherein said powerhouse/generator group includes a combination of a rotor and stator configured to generate electricity from rotational energy.

In an alternate embodiment of the invention, there is a power generation system wherein said airbine is integrated into an existing power management system of said electric vehicle to ensure an efficient distribution and usage of said generated electricity.

In an alternate embodiment of the invention, there is a power generation system further comprising a regenerative braking system that captures a kinetic energy during braking and converts said kinetic energy into electrical energy to be stored in said battery pack.

In a preferred embodiment of the invention, there is a method for generating electricity in an electric vehicle comprising the steps of: providing an airbine system with a powerhouse/generator group having internal components with a mass sufficient to act as a momentum flywheel, detecting an electric vehicle movement and managing an operation of said airbine system based on said electric vehicle movement, generating an electric current during an electric vehicle motion and short periods of inactivity, and storing said electric current in a battery pack.

In an alternate embodiment of the invention, there is a method for generating electricity further comprising a step of deactivating said airbine system when said electric vehicle remains stationary for an extended period.

In an alternate embodiment of the invention, there is a method for generating electricity further comprising a step of continuing to generate said electric current until friction and gravity bring said internal components to a stop during prolonged inactivity.

In an alternate embodiment of the invention, there is a method for generating electricity wherein said airbine system optimizes airflow through adjustable blades or vanes to maximize energy generation.

Advantages of the Airbine System for Electric Vehicles

On-the-go Charging: The airbine provides a groundbreaking advantage by enabling on-the-go charging of electric vehicle (EV) batteries, eliminating the need to stop for recharging. This feature significantly extends the vehicle's range and reduces the time and money spent on purchasing electricity from public or home charging stations. Users benefit from continuous driving without interruptions for recharging.

Reduced Waiting Times: The adoption of airbine technology greatly reduces waiting times at public charging stations. With fewer vehicles needing to stop and charge, the congestion at these stations diminishes, providing a more convenient and efficient experience for EV owners.

Relief for the Electrical Grid: Another significant advantage is the relief it offers to the electrical grid. The airbine lessens the additional load on the grid by decreasing the demand for external charging. This prevention of grid overloads and reduction in blackout risks contribute to a more stable and reliable grid management system.

Environmental Benefits: Environmentally, the airbine supports cleaner energy usage by reducing dependence on electricity from fossil fuel-powered plants. This reduction lowers greenhouse gas emissions and decreases air pollution, aligning with global efforts to combat climate change.

Increased EV Adoption: The airbine's cost-saving benefits make EVs more attractive, potentially increasing their adoption. By lowering the total cost of ownership, it rekindles interest in EVs, helping dealers manage overstock and making EVs a more appealing choice for consumers.

Protection of Domestic Industries: The airbine also supports domestic industries by potentially leading to regulations that mandate its installation in all new vehicles. This protection of US EV and car industries ensures job security and supports local manufacturing, reducing reliance on foreign EVs.

Seamless Integration: Seamless integration of the airbine during the vehicle's manufacturing process ensures uniform quality and eliminates the need for aftermarket modifications or special financing packages. This integration makes the airbine a standard vehicle component, enhancing its reliability and functionality.

Operation During Blackouts: During power outages, the airbine's ability to charge EVs on-the-go ensures that vehicles remain operational. This capability is particularly crucial for emergency services such as police, ambulances, and other first responders, providing continuous mobility during crises.

Government Savings: Governments can achieve significant cost savings with the airbine by reducing fuel expenses for their vehicle fleets. City, state, and federal levels, including the military, could see substantial reductions in operational costs, easing budget constraints.

Extended Fossil Fuel Availability: The airbine extends the availability of fossil fuel resources by reducing the overall need for them. This contribution helps delay the depletion of fossil fuel reserves, providing a transition period towards more sustainable energy sources.

Emergency Readiness: In emergencies, the airbine ensures that first responders and other critical services can continue operating, even during grid failures. This readiness enhances public safety and emergency response capabilities, reducing dependency on fossil fuels during disasters.

Reduced Terrorism Risk: The airbine lessens the attractiveness of power plants as targets for terrorist attacks by diversifying energy sources. This reduction in dependency on the grid enhances national security and reduces the potential impact of attacks on the electrical infrastructure.

Increased Grid Capacity: By freeing up capacity on the electrical grid, the airbine supports better allocation of electricity to other needs. This increase in grid capacity facilitates the integration of renewable energy sources, promoting a more sustainable energy ecosystem.

Enhanced Public Safety: In terms of public safety, the airbine provides a backup charging system, reducing the need for electricity from the grid during emergencies. This backup ensures the continuous operation of critical infrastructure and services, minimizing disruptions.

Safety in Accidents: The airbine enhances vehicle safety in accidents, as it does not contribute to fire hazards. This non-combustible feature reduces the risk of fire-related injuries or fatalities, providing peace of mind for EV owners.

Environmental Footprint Reduction: By reducing the overall environmental impact of vehicles, the airbine supports sustainability efforts. This reduction in environmental footprint contributes to cleaner air and a healthier environment, aligning with global sustainability goals.

Protection from Road Hazards: Finally, the airbine's placement under the hood protects it from external damage, such as road debris and adverse weather conditions. This protection ensures the durability and longevity of the system, maintaining its efficiency and reliability throughout the vehicle's lifespan.

Continuous Power Generation: The airbine system ensures that electricity generation continues even when the electric vehicle (EV) is stationary for short periods. This continuous power generation helps maintain the battery charge, reducing the risk of running out of power during idle times such as traffic stops or passenger pickups.

Improved Battery Efficiency: By providing a consistent source of energy, the airbine system helps keep the EV's batteries at optimal charge levels, improving overall battery efficiency and longevity.

Extended Driving Range: The additional electricity generated by the airbine can extend the driving range of the EV, allowing for longer trips without the need for frequent recharging.

Reduced Reliance on External Charging Infrastructure: With the airbine system generating power on the go, EV owners can rely less on external charging stations, making EVs more practical and convenient, especially in areas with limited charging infrastructure.

Enhanced Sustainability: The airbine system utilizes the vehicle's motion and airflow, making it a sustainable and eco-friendly solution for generating electricity without additional fuel consumption or emissions.

Energy Recovery During Braking: The system can be integrated with regenerative braking technology to capture kinetic energy during braking and convert it into electrical energy, further enhancing the vehicle's energy efficiency.

Optimized Airflow Management: The airbine's design, including adjustable blades or vanes, ensures optimal airflow management, maximizing energy capture and generation based on real-time conditions.

Reduced Wear on Battery: By maintaining a more consistent charge, the airbine system can reduce the depth of discharge cycles, potentially extending the lifespan of the EV's batteries.

Cost Savings: Reduced need for frequent external charging can lead to cost savings for EV owners over time, as they can utilize the self-generated electricity for day-to-day driving.

Scalability and Versatility: The airbine system can be adapted for use in various types of EVs, from passenger cars to delivery trucks, making it a versatile solution for a wide range of applications.

Enhanced Performance During Idle Times: The ability of the airbine system to generate electricity even when the vehicle is not moving can be particularly beneficial for vehicles that frequently stop and start, such as taxis, delivery vehicles, and public transportation.

Improved Energy Management: The integrated control unit allows for sophisticated energy management, optimizing the balance between power generation, storage, and usage, ensuring the most efficient operation of the EV.

Environmental Benefits: By enhancing the efficiency and range of EVs, the airbine system contributes to reducing the carbon footprint of transportation, supporting broader environmental goals and sustainability initiatives.

The airbine system is inherently scalable due to its modular design and versatile integration capabilities. The core components, such as the powerhouse/generator group and adjustable airflow mechanisms, can be adapted to suit various vehicle types, ranging from compact electric cars to large delivery trucks and even public transportation systems. This adaptability is achieved through configurable features like the size and mass of the momentum flywheel, which can be adjusted to match the energy generation needs of different vehicle sizes and usage patterns.

Additionally, the airbine's design supports seamless integration with existing vehicle architectures. Its placement options, such as within the front grille or under the chassis, allow manufacturers to incorporate the system during the standard production process without significant modifications. This flexibility reduces barriers to scaling up production and enables the airbine to serve a broad range of applications, including retrofitting existing electric vehicles. Moreover, its compatibility with various energy storage and management systems ensures that the technology can evolve alongside advancements in battery and vehicle technologies, further enhancing its scalability.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A power generation system for an electric vehicle comprising:
   an airbine housed within said electric vehicle;
   a powerhouse/generator group within said airbine;
   wherein a plurality of internal components, including at least a first fan blade and a second fan blade, of said powerhouse/generator group have a mass sufficient to act as a momentum flywheel;
   a battery pack having at least two charging ports connected to said powerhouse/generator group for storing generated electricity;
   a control unit for managing and reporting on an operation of said power generation system;
   a sensor for detecting a movement of said electric vehicle, and
   wherein said control unit is configured to regulate said operation of said airbine based on a status of said movement of said electric vehicle;
   wherein said control unit deactivates said powerhouse/generator group when said electric vehicle remains stationary for an extended period configured to prevent wear by limiting a speed of rotation of said plurality of internal components in order to prevent a harm or a destruction of said airbine and/or said plurality of internal components due to an excess in said speed of rotation from a pressure of air.

2. The power generation system of claim 1, wherein said control unit allows said powerhouse/generator group to continue recharging said battery pack until friction and gravity bring said plurality of internal components to a stop during prolonged periods of inactivity.

3. The power generation system of claim 1, further comprising a mechanism to manually override said control unit and continue power generation irrespective of a status of a movement of said electric vehicle.

4. The power generation system of claim 1, wherein said airbine is designed to optimize airflow to maximize a rotational energy imparted to said powerhouse/generator group.

5. The power generation system of claim 4, wherein said airbine further comprises adjustable blades or vanes to control airflow based on an electric vehicle speed and/or an environmental condition.

6. The power generation system of claim 1, wherein said powerhouse/generator group includes a combination of a rotor and stator configured to generate electricity from rotational energy.

7. The power generation system of claim 1, wherein said airbine is integrated into an existing power management system of said electric vehicle to ensure an efficient distribution and usage of said generated electricity.

8. The power generation system of claim 1, further comprising a regenerative braking system that captures a kinetic energy during braking and converts said kinetic energy into electrical energy to be stored in said battery pack.

9. The power generation system of claim 1, wherein said mass of said plurality of internal components of said powerhouse/generator group is configured to maintain rotation and continue producing electricity during a period of inactivity of said electric vehicle.

10. A method for generating electricity in an electric vehicle comprising the steps of:
    providing an airbine system with a powerhouse/generator group having internal components with a mass sufficient to act as a momentum flywheel,
    detecting an electric vehicle movement and managing an operation of said airbine system based on said electric vehicle movement,
    generating an electric current during an electric vehicle motion and short periods of inactivity,
    storing said electric current in a battery pack, and
    deactivating said airbine system when said electric vehicle remains stationary for an extended period.

11. The method of claim 10, further comprising a step of continuing to generate said electric current until friction and gravity bring said internal components to a stop during prolonged inactivity.

12. The method of claim 10, wherein said airbine system optimizes airflow through adjustable blades or vanes to maximize energy generation.

\* \* \* \* \*